No. 715,327. Patented Dec. 9, 1902.
F. C. WATSON.
RHEOSTAT.
(Application filed Apr. 2, 1902.)
(No Model.) 3 Sheets—Sheet 1.

Witnesses
H. J. Austin
D. E. Burdine

Inventor:
Frank C. Watson,
By Dodge and Sons,
Attorneys

THE NORRIS PETERS CO., PHOTO-LITHO., WASHINGTON, D. C.

No. 715,327. Patented Dec. 9, 1902.
F. C. WATSON.
RHEOSTAT.
(Application filed Apr. 2, 1902.)

(No Model.) 3 Sheets—Sheet 2.

Witnesses
H. T. Austin
D. E. Purdue

Inventor:
Frank C. Watson,
By Dodge and Sons,
Attorneys

THE NORRIS PETERS CO., PHOTO-LITHO., WASHINGTON, D. C.

No. 715,327. Patented Dec. 9, 1902.
F. C. WATSON.
RHEOSTAT.
(Application filed Apr. 2, 1902.)
(No Model.) 3 Sheets—Sheet 3.

Witnesses
H. S. Austin
D. E. Burdine

Inventor:
Frank C. Watson,
By Dodge and Sons,
Attorneys

UNITED STATES PATENT OFFICE.

FRANK C. WATSON, OF PHILADELPHIA, PENNSYLVANIA, ASSIGNOR TO SMITH-WATSON MANUFACTURING COMPANY, OF PHILADELPHIA, PENNSYLVANIA, A CORPORATION OF DELAWARE.

RHEOSTAT.

SPECIFICATION forming part of Letters Patent No. 715,327, dated December 9, 1902.

Application filed April 2, 1902. Serial No. 101,093. (No model.)

*To all whom it may concern:*

Be it known that I, FRANK C. WATSON, a citizen of the United States, residing at Philadelphia, in the county of Philadelphia and State of Pennsylvania, have invented certain new and useful Improvements in Rheostats, of which the following is a specification.

My present invention pertains to improvements in rheostats, the construction and advantages of which will be hereinafter set forth, reference being had to the accompanying drawings, wherein—

Figure 1:
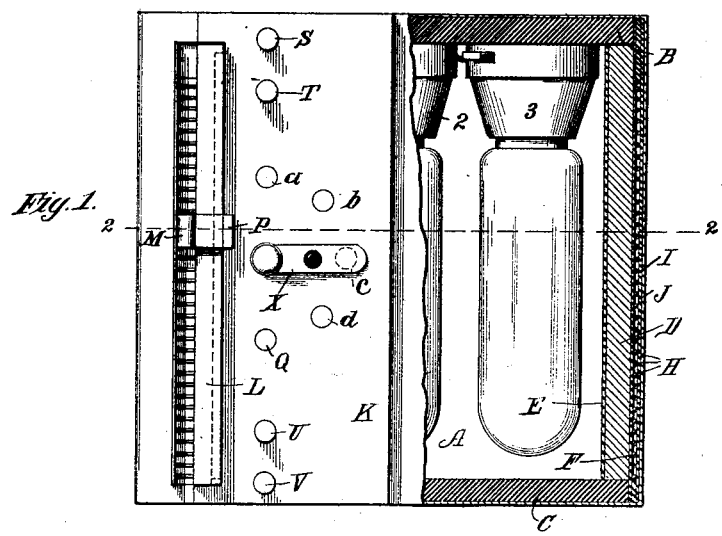
Figure 2:
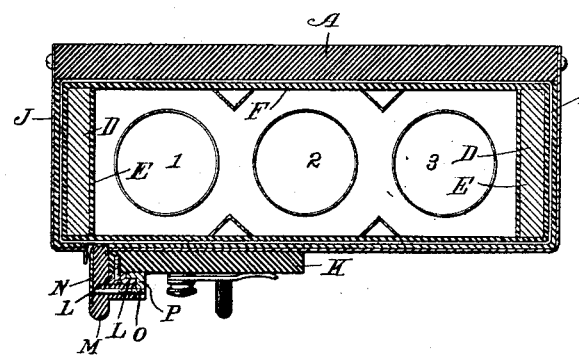
Figure 3:
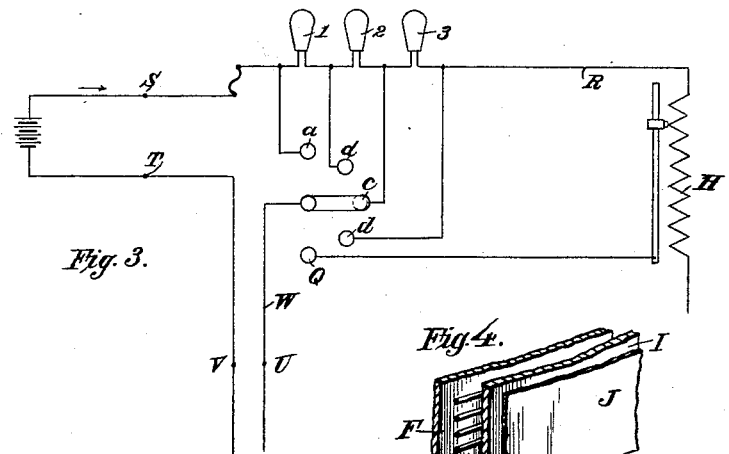
Figure 4:
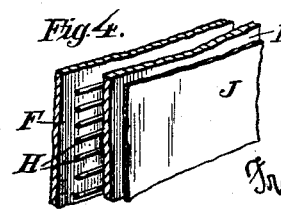
Figure 5:
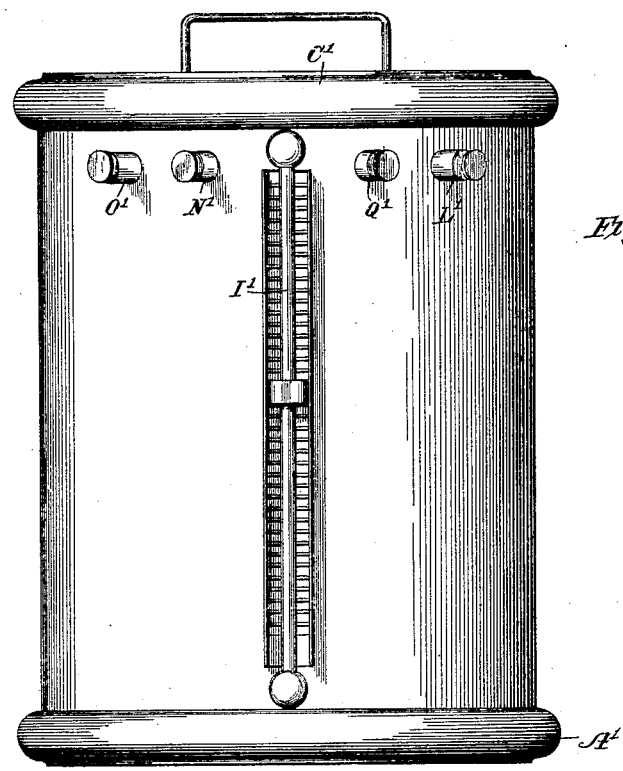
Figure 6:
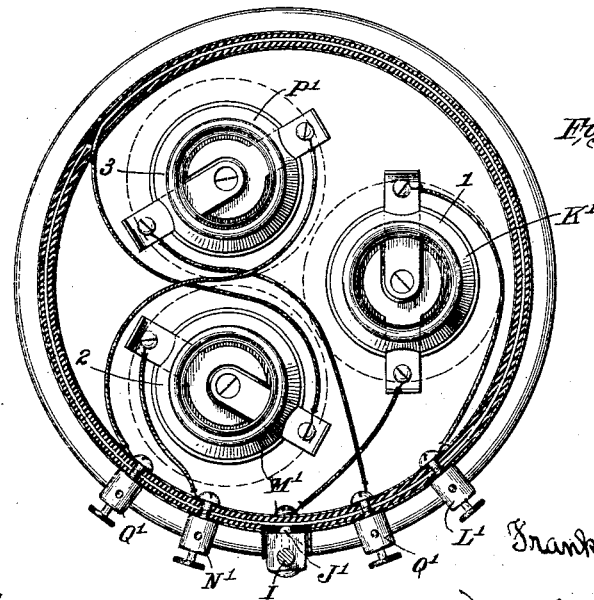
Figure 7:
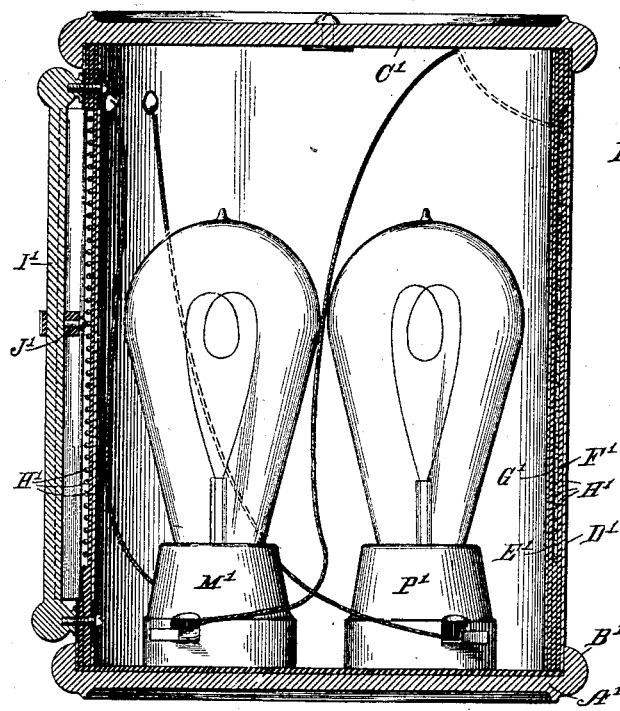
Figure 8:
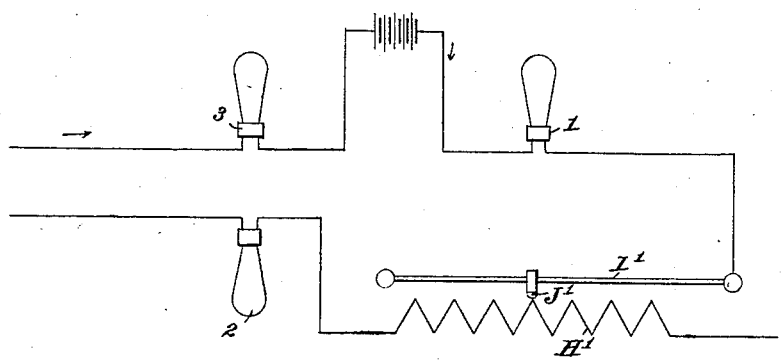

Figure 1 is a face view, partly in section, showing one form of the rheostat; Fig. 2, a transverse sectional view; Fig. 3, a diagrammatic view illustrating the course of the current; Fig. 4, a perspective view of a portion of the casing, showing its construction in detail; Fig. 5, an elevation of a modified form of the rheostat; Fig. 6, a transverse sectional view; Fig. 7, a vertical sectional view, and Fig. 8 a diagrammatic view illustrating the course of the current in said modified form of the apparatus.

The object of the present invention is to produce a simple portable rheostat suitable more particularly for use in connection with surgical and dental instruments, though equally applicable for employment in other connections. In fact, the apparatus may be employed in any relation where a variable regulation of current is desired.

Two forms of the apparatus are shown in the accompanying drawings, the underlying principles of construction being the same in each and the apparatus as a whole being slightly modified in its general form.

Referring first to Figs. 1 to 4, A denotes the back of the frame or casing formed of some non-conducting material, B the top, and C the bottom. Two uprights D are secured between the top and the bottom at the ends thereof, and a sheet of tin, light sheet-iron, or a sheet of fiber E is passed about and around these uprights. A layer of asbestos F or other suitable insulating medium is then laid upon the oblong core-piece thus formed and German-silver wire H is wound about the whole, the convolutions of the wire embedding themselves slightly in the insulating material, so that they will not shift and consequently short-circuit. A second layer I of asbestos is then wrapped about the coil, and finally the outer sheathing or metallic covering J is then secured in place. Preferably at one end of the casing the cover J is cut and turned outwardly, leaving a slot or channel, the asbestos I being likewise cut away to expose the wire coils. Secured to the casing to one side of the slot thus formed is a plate K, carrying a guide or way L, upon which is mounted a sliding block M. Said block M carries a metallic shoe N, which makes contact with the various wire coils as the block is moved up or down. The current passes from shoe N through screw O to retaining-block P, which has a rubbing contact with the slide or way L. Said slide is connected at its lower end to a terminal Q, while the upper end of the coil is connected to line R, leading to the battery or source of current and having interposed therein a series of incandescent lamps 1, 2, and 3. S and T denote the battery binding posts or terminals, while U and V represent the corresponding members to which the wires leading to the instrument are connected. Post U is connected by wire W to the pivot of a switch X. Said switch may make contact with terminals $a$, $b$, $c$, and $d$ and Q, the terminals $a$, $b$, $c$, and $d$ being connected with branches which cut out any or all of the lamps and also the coils, or the switch may be brought over onto point Q, in which event all the lamps and the coil will be in line. By moving block M up or down a greater or less number of coils will be brought into circuit, or if moved entirely to the top it will pass out of contact with the coil, and thus break the circuit. By substituting lamps of different voltage the range of current may be changed and the limits of the rheostat varied. The lamps absorb the major portion of the current and, with the convolutions of the coil, effectually prevent the generation of heat in the instrument. The strength of current may also be varied by moving the switch, whereby one or more of the lamps will be in circuit or all the lamps and the coil.

In Figs. 5 to 8, inclusive, a modified form is illustrated, wherein instead of employing or building up a structure substantially oblong in shape a containing casing circular in cross-section is employed. The modified structure comprises a base A', formed with an upstanding collar or rim B' and a similar top or cover C', between which members are securely held the shells D' E', with the interposed layers of asbestos or similar material F'' G' and the coil of German-silver wire H'. As in the former construction, a channel or opening is left in the outer shell D', through which the convolutions of the wires are exposed. A rod I' is secured to the casing in line with the slot, and a sliding block of insulated material is mounted thereon, said block carrying a pin or stud J', which makes contact with the convolutions of the coil, completing the circuit between said coil and the rod. Within the casing is secured a series of incandescent lamps, three being shown. Lamp K' is connected on one side to a binding-post L', while the opposite side of the lamp is in circuit with the upper end of rod I' and through the slide with the coil. The upper end of the coil is in turn connected to lamp M', while the opposite side of the lamp is connected to binding-post N', which leads to the instrument or the like. Companion binding-post O' is connected to lamp P', which in turn is connected to the outgoing terminal or binding-post Q'. By shifting the sliding block on the rod the current may be varied as desired, being entirely cut off when it reaches its lowest point by reason of passing out of contact with the coil. The cover is removably secured to the casing, so that the lamps may be renewed or changed when desired.

The apparatus in both constructions forms a suitable casing for the lamps and prevents the same from being broken.

Having thus described my invention, what I claim is—

1. In a rheostat, the combination of a suitable hollow casing; a resistance inclosed therein; a resistance-coil carried by said casing and having its convolutions exposed at one point; a contact member movable over the resistance-coil; and suitable terminals for the coil and contact member.

2. In a rheostat, the combination of a suitable casing; a lamp mounted within the casing; a resistance-coil embedded within the casing and having its convolutions exposed at one point in the wall of the casing; a contact member movable over the resistance; and suitable terminals for the resistance.

3. In a rheostat, the combination of a suitable casing; a lamp mounted within the casing; a resistance-coil embedded within the casing and having its convolutions exposed at an opening extending transversely to the coils; connections intermediate the coil and the lamp; a bar or guide mounted adjacent to the opening in the casing; a contact member slidably mounted on said bar; and suitable terminals for the coil and lamp.

4. In a rheostat, the combination of a suitable casing, comprising an inner and outer shell with a non-conducting material between them; a resistance-coil embedded in said non-conducting material; a lamp mounted within the casing; connections intermediate said coil and the lamp; a contact member movable over the convolutions of the coil, substantially as described; and suitable terminals for the resistance and the lamp.

5. In a rheostat, the combination of a suitable inclosing casing; a lamp mounted within the casing; a resistance-coil carried by the casing; a contact member movable over the coil to place a greater or less number of the coils in circuit; and suitable terminals for the coil.

6. In a rheostat, the combination of a suitable casing; a series of lamps mounted within the casing; a resistance-coil embedded within the casing and having its convolutions exposed at one point in the wall of the casing; a contact member movable over the resistance; and suitable terminals for the resistance.

7. In a rheostat, the combination of a suitable hollow casing; a removable resistance contained therein, whereby said resistance may be varied and changed as desired; a resistance-coil embedded in the wall of said casing and having its convolutions exposed at one point therein; and a contact member movable over said convolutions.

In testimony whereof I have signed my name to this specification in the presence of two subscribing witnesses.

FRANK C. WATSON.

Witnesses:
HORACE A. DODGE,
J. B. MALNATÉ.